(12) United States Patent
King et al.

(10) Patent No.: US 9,039,988 B2
(45) Date of Patent: May 26, 2015

(54) STACKABLE CARTRIDGES FOR BULK FEEDERS

(71) Applicants: Joseph A. King, Wayzata, MN (US); Jeffrey D. Johnson, Edina, MN (US)

(72) Inventors: Joseph A. King, Wayzata, MN (US); Jeffrey D. Johnson, Edina, MN (US)

(73) Assignee: King Technology, Inc., Hopkins, MN (US)

( * ) Notice: Subject to any disclaimer, the term of this patent is extended or adjusted under 35 U.S.C. 154(b) by 0 days.

(21) Appl. No.: 13/998,250

(22) Filed: Oct. 15, 2013

(65) Prior Publication Data

US 2014/0054210 A1    Feb. 27, 2014

Related U.S. Application Data

(62) Division of application No. 13/573,020, filed on Aug. 14, 2012, now Pat. No. 8,636,962.

(60) Provisional application No. 61/628,089, filed on Oct. 24, 2011.

(51) Int. Cl.
| | |
|---|---|
| B08B 3/00 | (2006.01) |
| B65G 59/00 | (2006.01) |
| B01D 11/02 | (2006.01) |
| E03B 11/00 | (2006.01) |
| B01F 1/00 | (2006.01) |
| B01F 5/04 | (2006.01) |
| B01F 15/00 | (2006.01) |
| C02F 1/68 | (2006.01) |
| B01J 8/00 | (2006.01) |
| C02F 1/76 | (2006.01) |
| C02F 103/42 | (2006.01) |
| C02F 1/50 | (2006.01) |

(52) U.S. Cl.
CPC .......... *B01F 1/0027* (2013.01); *Y10T 29/49826* (2015.01); *B01F 5/0496* (2013.01); *B01F 15/00344* (2013.01); *C02F 1/688* (2013.01); *C02F 1/76* (2013.01); *C02F 2103/42* (2013.01); *C02F 1/50* (2013.01); *B01J 8/003* (2013.01)

(58) Field of Classification Search
CPC ............ A61L 2/00; C02F 1/10; C02F 3/1284
USPC ............. 210/748.16, 749; 422/261, 272, 311; 134/43, 84, 93; 221/92; 222/129, 478; 137/268
See application file for complete search history.

(56) References Cited

U.S. PATENT DOCUMENTS 4,691,732 A * 9/1987 Johnson et al. ............... 137/268

* cited by examiner

*Primary Examiner* — Monzer R Chorbaji
(74) *Attorney, Agent, or Firm* — Jacobson & Johnson LLC (57) ABSTRACT

A set of vertically stackable interacting cartridges for improving the delivery of biocide of a bulk feeder by positioning the stackable cartridges in a stacked condition within a chamber in the bulk feeder wherein the stackable cartridges are maintained in vertical interacting flow alignment with each other to provide enhanced control of the delivery of the biocide carried within each of the stackable cartridges without replacing the control valves of the bulk feeder.

21 Claims, 8 Drawing Sheets

STACKABLE CARTRIDGES FOR BULK FEEDERS

CROSS REFERENCE TO RELATED APPLICATIONS

This application is a divisional application of Ser. No. 13/573,020 filed Aug. 14, 2012 (pending) and claims priority from U.S. provisional application Ser. No. 61/628,089 filed Oct. 24, 2011.

FIELD OF THE INVENTION

This invention relates generally to dispensing cartridges and, more specifically, to an interactive stackable cartridge system for dispensing water purification materials from a feeder such as a bulk dispenser.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the ways of ridding pools, spas or other bodies of water of harmful organism is to add a halogen such as chlorine or bromine to the body of water. Typically, the halogen may be added to the body of water through a bulk feeder. In the bulk feeder tablets or pucks of chlorine or bromine are placed in a chamber of the bulk feeder where the water flowing through the bulk feeder comes into contact with the halogen located therein.

One of the disadvantages of the bulk feeders is that it is difficult to control the level of halogen that is dispersed into the body of water, which often results in over chlorination or over brominating of the body of water. While such bulk feeders are relatively inexpensive the cost of the overuse of chlorine and or bromine in the bulk feeders can quickly negate any benefits of the bulk feeder. To reduce the problem of over chlorination or bromination as well as improving the control of the level of chlorine or bromine in a body of water other types of feeders that separately dispense two different biocides may be used.

One method and apparatus for controlling the harmful organisms in a body of water in a bulk feeder uses two dispensers that deliver two different biocides. Such a device is shown in King U.S. Pat. No. 7,347,935. In this device the two biocides are located in two separate dispensers that are placed in a free or non-fitted condition in the chamber of a bulk feeder. The dispensers are allowed to move about in the chamber in response to the fluid flow through the chamber of the feeder, which enables the water to come into contact with the biocides located therein. As the dispensers move about in the chamber of the feeder the biocides therein are released into the water passing through the chamber of the feeder. In such devices in addition to the control valve on the feeder the dispensers may include adjustable valves on each dispenser in order to better control the dispersant level of each of the biocides.

Another chemical feeder for dispensing two chemicals into a pool is shown in U.S. Pat. No. 5,251,656 where two compartments containing water treatment materials with a venturi housing to draw the water treatment materials out of each of the compartments and into the pool.

U.S. Pat. No. 6,471,858 shows a dispensing apparatus where a pair of cylindrical containers containing water treatment materials are located in a coaxial condition. The containers are cantileverly mounted within a top chamber in a sand filter, which allows the water to flow through both of the containers before flowing through a bed of sand.

Another method and apparatus for accurately delivering two biocides from a single chamber in an inline feeder is shown in King U.S. Pat. Nos. 6,527,952 and 6,190,547. In this device two nestable canisters are concentrically positioned in the chamber of an inline feeder with each of the nestable canisters having inlets and outlets that separate the flow of water into two separate streams with each of the two streams following separate but parallel flow paths through the biocides in their respective nestable canisters.

Since most feeders are integrally mounted in a circulation line of a body of water such as a pool or spa the conversion of a bulk feeder to a cartridge system that can accurately deliver two different biocides becomes costly since one may have to remove and replace the existing bulk feeder with a feeder that provides parallel flow paths through the dispensers therein. In other cases where the dispensers are free to move about the chamber of the feeder the task of control of the delivery rate of the biocides from the separate dispensers becomes more delicate since in addition to adjusting the setting of the control valve of the bulk feeder the valve of one or both of the dispensers may need to be adjusted to control the flow of water through the dispensers and hence the level of biocide that is delivered to the body of water. Thus a need exists for a cartridge system that can be used in prior art bulk feeders to alleviate problems of over halogenation but also provide a system for delivering two or more biocides to the body of water, which for example may be a pool, a spa or the like although the cartridge system may be used with any body of water which requires delivery of a biocide thereto.

In contrast to the prior art the system described herein the invention allows one to provide dispersant control which avoids over halogenation of the body of water in existing bulk feeders and without having to separately adjust gate valves on each of dispensers used in the bulk feeder.

SUMMARY OF THE INVENTION

A set of inline vertically stackable cartridges for improving the delivery of a biocide from a prior art bulk feeder using a set of stackable cartridges located in an end to end condition within a chamber in a bulk feeder wherein the stackable cartridges are maintained in flow alignment with each other to provide an interactive flow resistance that results in the feeder providing enhanced control of the delivery of each of the biocides carried therein without need to replace the control valve of the bulk feeder or to install a feeder with fitted cartridges.

DESCRIPTION OF THE PREFERRED EMBODIMENT

Figure 1:
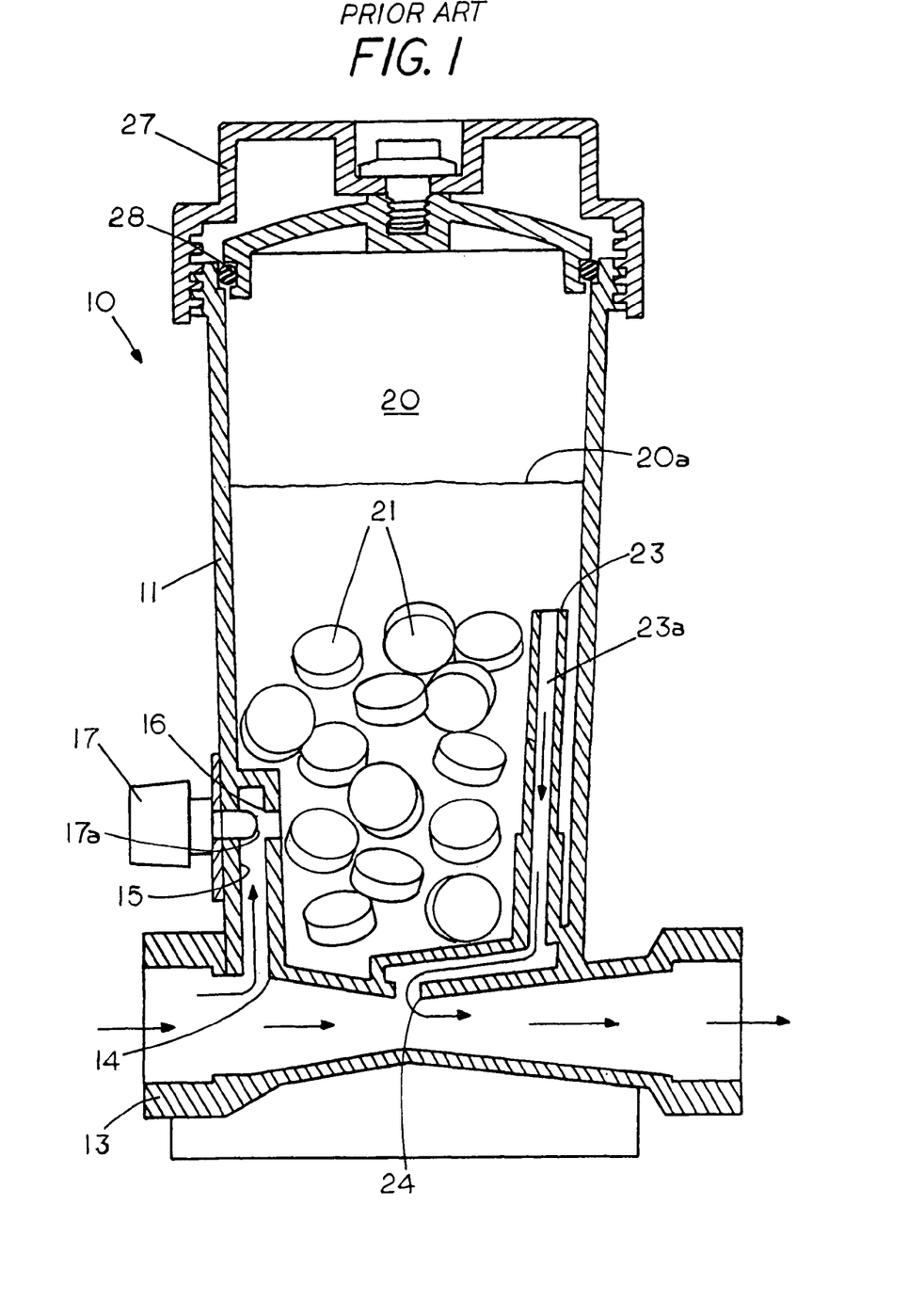
FIG. 1 shows in cross section an example of a prior art bulk halogen feeder.

FIG. 1 shows a typical example of a prior art bulk halogen feeder 10, which is sold by Hayward Industries, Inc., having a frusto conical housing 11 with a lower venturi 13 having an inlet 14 for directing a portion of the water flowing therethrough into a channel 15 and through a passage 16 and into chamber 20 where the water contacts the halogen 21, which is in bulk form and is shown located below the water line 20a in the chamber 20. In this example a rotatable control valve 17 allows one to increase or decrease the amount of water flowing into chamber 20 and consequently into contact with the bulk chlorine tablets 21 by reducing or increasing the spacing between valve end 17a and passage 16. Once the water contacts the halogen tablets 21 the water can flow out of chamber 20 through a fluid passage 23a in a vertical stand tube 23 and back into the venturi 13 through the port 24. A cover 27, which is sealed to the housing 11 through an annular seal 28, normally maintains the bulk feeder in a closed condition when the system is in use. It is this type of feeder that is prone to over halogenation because the water flows freely through the halogen tablets 21 before being discharged through the stand tube 23.

Figures 2, 2A:
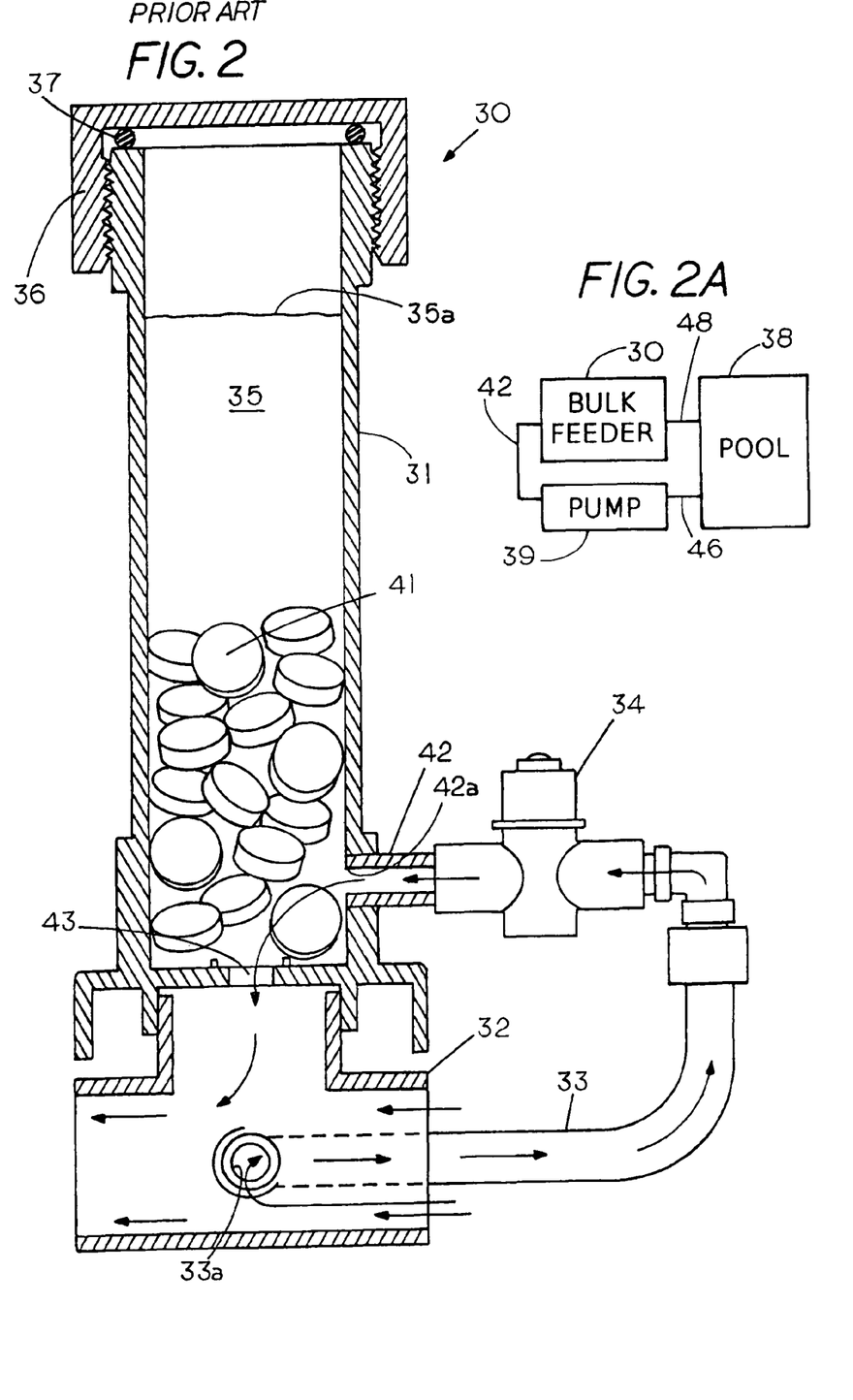
FIG. 2 shows cross section an example of another type of prior art bulk halogen feeder.
FIG. 2A shows a swimming pool with a bulk feeder.

FIG. 2 shows another typical example of a prior art bulk halogen feeder 30, which is sold by Rainbow Lifeguard Products, Inc., having a cylindrical housing 31 with a lower main line fitting 32 which attaches to an inline circulating system. A side tap 33a directs a portion of the water from the main line fitting 32 through a pipe 33 to a control valve 34, which can be used to limit the flow of water from the main line through the chamber 35. The housing includes a cover 36 and an annular seal 37, which creates an airtight chamber 35. In operation a portion the water flowing through the main line fitting 32 flows into side tap 33a through pipe 33, control valve 34, pipe 42 and inlet 42a where it can then flow through the bulk chlorine tablets 41, which are located below the water line 35a in chamber 35. The water with the dissolved halogen therein then flows out of the chamber 35 through outlet 43 and into the fitting 32 where it is returned to the main inline circulation system. This type of system has also been found to become over halogenated since the halogen tablets 41 are rapidly dissolved by the water flowing through the open chamber 35.

Briefly, in both of the above type of systems the halogen in puck or tablet form is located in the chamber of the bulk feeder while one attempts to control the release of the halogen therefrom by using a flow valve on the feeder to direct more or less water through the bulk halogen tablets, which are stacked loosely and randomly in the chamber of the bulk feeder. Unfortunately, the accurate and controlled delivery of halogen to the body of water becomes difficult when the tablets or pucks are located in the chamber in the bulk feeder since the delivery rate is sensitive to the variable resistance offered by the dissolvable halogen pucks or tablets as well as the number tablets or pucks that are located below the water line 35a. Because of the difficulty in accurately delivering the proper amount of halogen through bulk feeders such as described an operator may want to ensure that a minimum amount of halogen is always available in the water, which may result in valve settings on the feeder that causes over halogenation i.e. over chlorination or over bromination of the body of water. The above are two examples of bulk halogen feeders that are prone to over halogenation, however, other types of feeders may also be prone to problems of over halogenation.

In order to better control the levels of halogen in existing bulk feeders the invention described herein includes a set of vertically stackable cartridges that can be placed in fluid alignment in the open chamber of the prior art bulk feeders to allow an operator to more accurately control the level of halogen delivered to a body of water even though only one of the vertically stackable cartridges may contain a halogen in puck or tablet form. As pointed out, one of the difficulties with bulk feeder systems that rely only on a halogen is that the level of halogen in the system must be maintained relatively high in order to ensure that the water is free of harmful organisms, which may result in the body of water having an annoying or obnoxious chlorine or bromine smell if the water is over halogenated.

One of the ways of lowering the level of the necessary halogen in a body of water is to use a two bactericide system that uses a secondary biocide material such as a source of metal ions in addition to the halogen which allows the halogen level to be maintained at a lower level since the two bactericides working together can effectively kill harmful microorganisms that would normally require a higher halogen level if only the halogen were present. The combination of the simultaneous delivery of two biocides can be effective in maintaining a system free of harmful organisms while at the same time reducing the obnoxious presence of high levels of halogens in the body of water. An example of a two-biocide or bactericide system is shown in my U.S. Pat. No. 6,527,952, which is hereby incorporated by reference. Unfortunately, such two bactericide systems require the homeowner to replace the bulk halogen feeder with a new inline cartridge feeder in order to properly dispense and maintain the lower halogen level since the bulk feeder controls and the open chamber in the bulk feeders are generally not well suited for maintaining low levels of halogen in the body of water.

The system described herein comprises a set of interacting vertically stackable cartridges that can be placed in a chamber of a bulk feeder, which normally holds halogen in bulk form, to provide a cartridge system that can more precisely deliver a halogen at a lower rate to the body of water, which allows one to maintain a lower halogen level in the body of water, while still maintaining the body of water in a safe condition with the system including the ability to adjust the valve on the bulk feeder to maintain the chlorine level at about 0.5 ppm or lower without modification of the bulk feeder.

Figure 3:
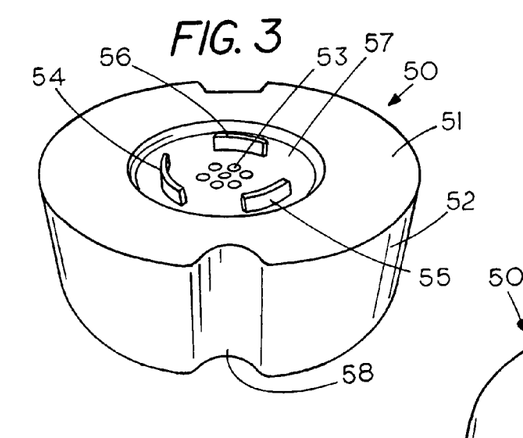
FIG. 3 shows a top perspective view of a stackable cartridge.
Figure 4:
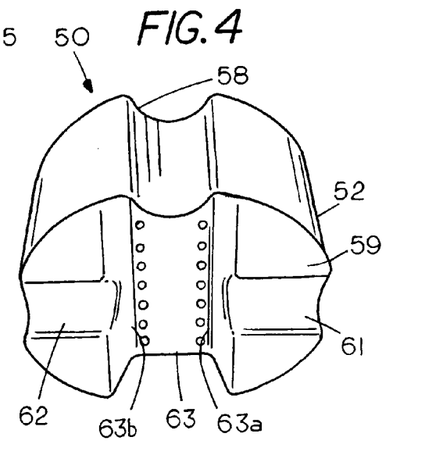
FIG. 4 shows a bottom perspective view of the stackable cartridge of FIG. 3.

FIG. 3 shows a top perspective view of a vertically stackable cartridge 50 and FIG. 4 shows a bottom perspective view of the stackable cartridge 50 for placement in a bulk feeder as part of an interacting stackable two cartridge system, which may be used to reduce over chlorination or over bromination in a bulk feeder that normally holds a halogen in solid form therein. Typically, lower stackable cartridge 50 contains a biocide, which may be minerals, for example, a source of metal ions such as silver ions or copper ions. The stackable cartridge 50 comprises a cylindrical container having a circular top member 51, a bottom member 59 and a cylindrical side wall 52 which coact to form a chamber therein for holding and dispensing a biocide such as metal ions therefrom. The metal ions such as copper ions, silver ions, or zinc ions can be delivered from the chamber by minerals which are retained within the stackable cartridge during the dispensing process to provide a relatively fixed fluid resistance of flow through the stackable cartridge 50. Bottom member 59 includes a feature comprising a diametrical extending valley 63 with a first set of fluid passages 63a on one side of valley 63 with the fluid passage 63a providing a first bottom fluid inlet to the chamber therein and a second set of fluid passages 63b on the opposite side of valley 63 with the fluid passages 63b providing a second bottom fluid inlet to the chamber in stackable cartridge 50.

The top member 51 includes a set of centrally positioned top fluid passages 53 for a restrictive flow of fluid therethrough. The top fluid passages 53 and the bottom fluid passages are sized so as to retain the solid biocides within the chamber of the stackable cartridge 50 while allowing water to flow into and out of the chamber in stackable cartridge 50. Located around fluid passages 53 is a cartridge support or spacer comprising a set of three axial protrusions 54, 55 and 56, which extend upward from inner top member 57. The purpose of the support is to at least partially support a stackable cartridge there above as well as to provide a diametrical flow passage between the bottom of a top stackable cartridge 70 and the top of the bottom stackable cartridge 50. The support can thus maintain the second or top stackable cartridge in a stacked but bottom spaced condition from the first stackable cartridge. In order to maintain the stackable cartridge 50 in proper operating position cartridge 50 includes a feature or locator 58 comprising a semi hemispherical vertical notch, which engages with a vertical feature of the bulk feeder such as a standpipe 23 (FIG. 7) of the bulk feeder to maintain the cartridge in a fixed rotational position therein. In addition the bottom of cartridge 50 includes a further feature or locator 63 comprising a valley as well as cross-valley 61 and 62 which are also configured so as to interact with internal features on the bottom of bulk feeder to prevent rotation of the stackable cartridge 50 during the operation of the bulk feeder with the stackable cartridges located therein. While the locator or feature on the stackable cartridges is shown as notches or valleys in a side of stackable cartridge 50, other types of locators or features of the stackable cartridges may be used for engagement with features of the bulk feeder to maintain the stackable cartridges in the proper orientation so that water can be directed through the biocide in the stackable cartridge 50. In this example the locator on the cartridge 50 and the locator 74 on the stackable cartridge 70 are in engagement with a common feature of the bulk feeder, namely, the standpipe 23 of the bulk feeder to maintain the stackable cartridge 50 and the stackable cartridge 70 in fluid alignment with each other to permit flow through the stacked cartridges 50 and 70. Thus the vertically stackable cartridge system described herein can take advantage of internal features of the bulk feeder to maintain the stackable cartridges in a fixed rotational condition and in fluid alignment with each other in a bulk feeder, which can eliminate the condition of random flow of water through the halogen which is located in the chamber of the feeder. A further feature of the inline stackable cartridges is the use of biocide such as a non-dissolvable source of minerals in one of the stackable cartridges, which can also be used to both deliver a biocide and maintain an internal inline flow resistance during the delivery of the biocide to the body of water. A dissolvable biocide such as chlorine or bromine may be located in the other inline stackable cartridge.

Figure 5:
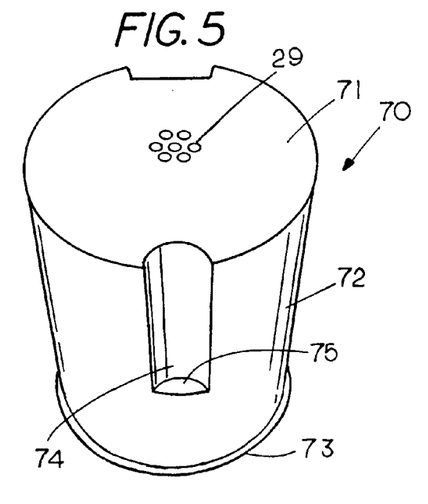
FIG. 5 shows a bottom perspective view of another stackable cartridge.
Figure 6:
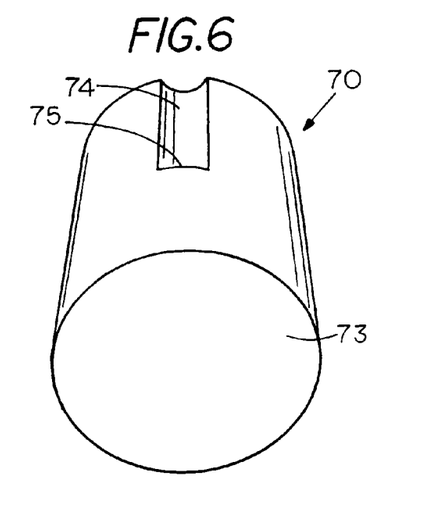
FIG. 6 shows a top perspective view of the stackable cartridge of FIG. 5.

FIG. 5 shows a bottom perspective view of a stackable cartridge 70 and FIG. 6 shows a top perspective view of the stackable cartridge 70 for stacking with the stackable cartridge 50 of FIG. 3 and FIG. 4. The stackable cartridge 70, which typically contains a halogen, comprises a cylindrical container having a circular bottom member 71, a closed top member 73 and a cylindrical sidewall 72 which coact to form a chamber therein with an upper portion of chamber for trapping air therein and for holding a portion of a halogen such as chlorine or bromine in solid form above a water line therein to limit the water contact with the halogen and thus limit the dissolution rate of the halogen. The internal flow resistance of the flow path established between and within stackable cartridges allows the existing feeder control valve on the bulk feeder to be used to deliver a halogen at a more sustainable rate then if only halogen is located in the feeder.

Extending in an axial direction along sidewall 72 is a feature or locator comprising an elongated hemispherical notch 74. Notch 74 engages with a feature of the interior of the bulk feeder such as a standpipe 23 (FIG. 7) to maintain the fixed rotational position of the stackable cartridge 70 with respect to the bulk feeder. Since the bottom portion of stackable cartridge 50 includes a similar locator 58 for engaging with the same standpipe the stackable cartridge 50 and stackable cartridge 70 can be maintained in the same orientation with respect to each other and to the bulk feeder to provide fluid alignment between the stackable cartridges as water flow into the bottom inlet of stackable cartridge 50 and out the outlet port 75 in top stackable cartridge 70.

FIG. 5 shows a bottom perspective view of stackable cartridge 70, which may be used as a halogen stackable cartridge 70 revealing a fluid port having set of openings 29 with the fluid port centrally located in bottom member 73. Port 29 permits ingress and egress of fluids therein while retaining a halogen in solid form therein.

Figure 7:
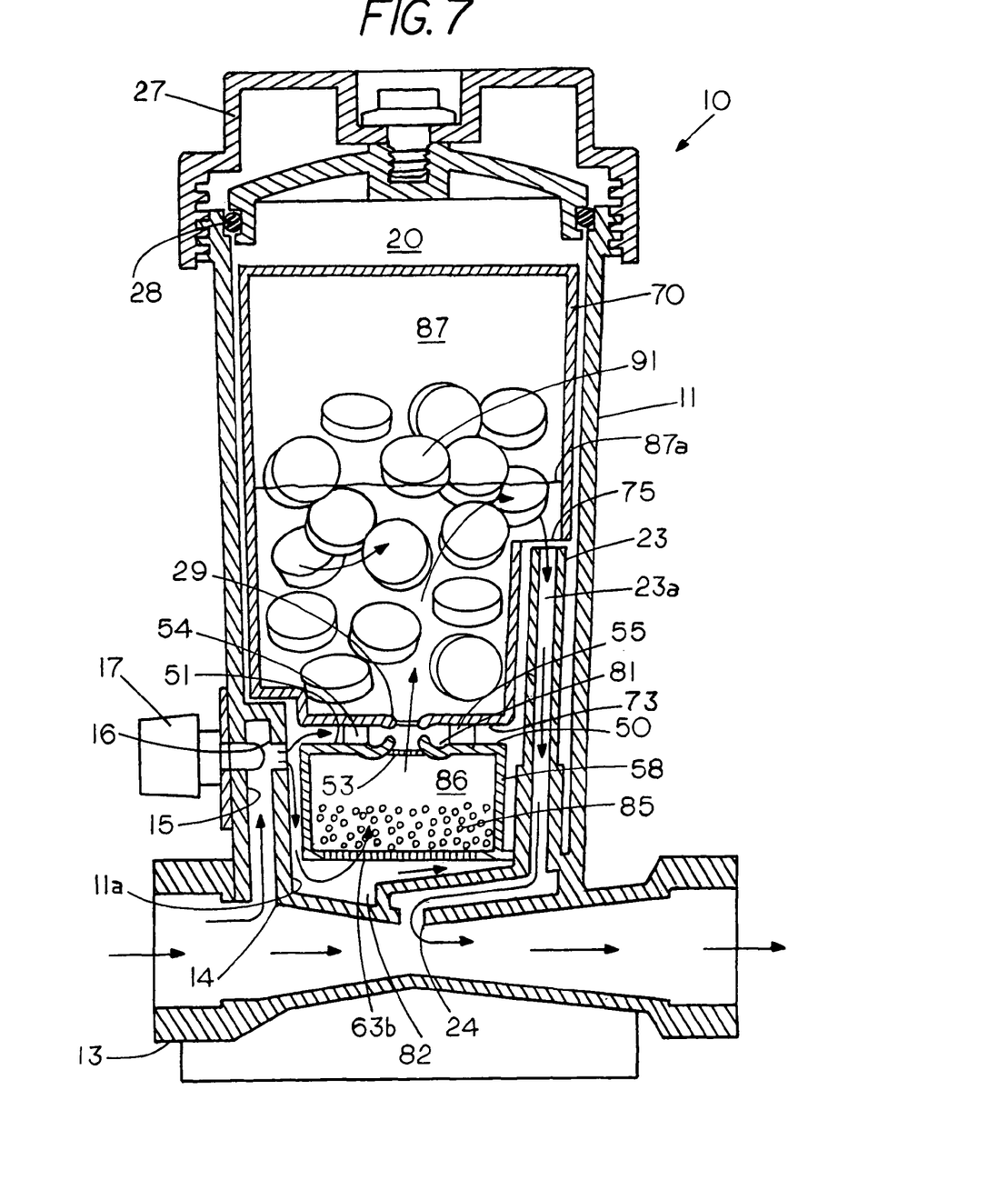
FIG. 7 shows the prior bulk halogen feeder of FIG. 1 containing the stackable cartridge of FIG. 3 and FIG. 5.

FIG. 7 shows a sectional view of a prior art bulk feeder 10, which has been converted to a two biocide feeder, with the stackable cartridge 70 and the stackable cartridge 50 in section therein. The stackable cartridge 70 is stacked is a spaced condition on top of the cartridge 50 to form a diametrical fluid passage 81 therebetween. When the stackable cartridges 50 and 70 are located in a stacked condition the fluid inlet 29 in top member 70 is in axial fluid alignment with fluid outlet 53 in bottom member 51 of the cartridge mineral dispenser 50. In addition the cartridge 50 is positioned in the bottom of bulk feeder chamber 20 such that fluid from inlet 16 flows not only into the diametrical passage way 81 but also into the chamber 82 formed between the outside of stackable cartridge 50 and the inside wall 11a of housing 11 and the chamber located below cartridge 50. Thus both parallel and series flow exists in this arrangement.

To appreciate the flow of water through a bulk feeder 10, which contains the stackable cartridge dispensers 50 and 70, reference should be made to FIG. 7, which shows multiple sets of arrows to indicate the flow of water into and through the stacked dispensing cartridges 50 and 70. FIG. 7 shows that water from the main line venturi 13 enters the bulk feeder chamber 20 through the side inlet 16. The flow of water then separates with some of the water flowing into and through a diametrical passage 81 located between the top of stackable cartridge 50 and the bottom of stackable cartridge 70 while some of the water flows into the bulk feeder lower chamber 82, which contains the stackable cartridge 50. In this example the stackable cartridge 50 contains a source of metal ions 85 such as a batch of minerals in granular form. The water in chamber 82 flows upward through the minerals 85 which are located in chamber 86 of stackable cartridge 50 thereby releasing metal ions into the water in chamber 86. A portion of the water in chamber 82 flows axially upward through top outlet 53 of cartridge 50 and into chamber 87 through the bottom inlet 29 of halogen cartridge 70 where the water contacts a halogen such as solid chlorine pucks or tablets 91 thereby releasing chorine into the water. The water level in chamber 87 is indicated by water line 87a with a portion of the pucks or tablets 91 located below the water line. The water, which is chlorinated through the dissolution of the tablets or pucks therein, is then discharged though outlet 75 into an outlet passage 23a in stand pipe 23. In addition to water flowing through the chlorine tablets 91a portion of the water from diametrical passage 81 and chamber 82 can flow upward outside of cartridge 50 and cartridge 70 until it discharges through the standpipe 23. The flow of water through the fluid resistance provided by stacked cartridges 50 and 70 and the contents therein results in the level of halogen to be maintained at lower levels using only the existing control valve 17 than if the tablets or pucks where placed in chamber 20 without the stackable cartridges therein. Thus the placement of the stacked cartridges 50 and 70, which are located in a flow path as shown in FIG. 7, provides more accurate control of the level of halogen delivered by the bulk feeder than if the halogen tablets were located in the open chamber 20. In addition, although the stackable cartridges contain no control valve the flow resistance of the stackable cartridges allows one to maintain a lower level of halogen using the existing control valve of the feeder since the stackable cartridges eliminates a direct flow path into and through the bulk halogen, which has been believed to be at least a partial cause of a problem of over halogenation with bulk halogen feeders.

Figure 8:
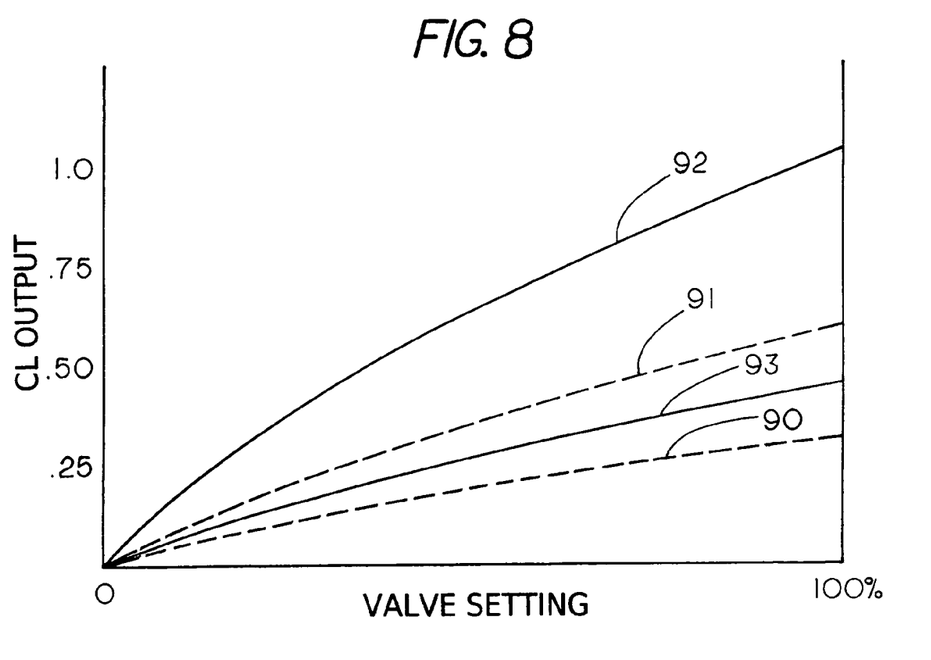
FIG. 8 is a graph of the comparative control of a halogen in a bulk feeder with and without the cartridges therein.

To illustrate the benefits obtained with the use of the stackable cartridges in comparison to a feeder without stackable cartridges reference should be made to FIG. 8. FIG. 8 a graph of the chlorine output of a bulk feeder as a function of the bulk feeder control valve setting under bulk feeder conditions and the chlorine output of a bulk feeder as a function of the bulk feeder control valve setting when two interactive stackable cartridges are located in the chamber of the bulk feeder. Line 92 represents the chlorine output in ounces/per hour as a function of the position or setting of the control valve 17 in the bulk feeder mode i.e. using tablets or pucks of halogens in the bulk feeder as shown in FIG. 1. Located below line 92 is a dashed line representing a second chlorine output line 91, which represents a desired maximum chlorine output rate and dashed line 90, which represents a minimum chlorine output rate that should be maintained by the feeder in order to properly control the level of halogen so as to avoid conditions that would lead to under halogenation or under halogenation of the body of water when a halogen is used in conjunction with a second biocide such as a source of metal ions. As evident from the chlorine output 92 obtained with bulk feeder control valve, the use of the bulk feeder control valve 17 alone lacks the ability to reduce the chlorine delivery rates to delivery rates which would fall between line 91 and line 90.

Located between chlorine output line 91 and chlorine output line 90 is a third chlorine output line 93 which represents the actual chlorine output of the bulk feeder 10 obtainable with a set of interacting stackable cartridges 50 and 70 located in fluid series in the chamber of a bulk feeder. More specifically, the output 93 reflects bulk feeder 10 with a first stackable cartridge 50, which contains a source of minerals such as a source of metal ions therein, and a second stackable cartridge 70, which contains a biocide such as chlorine in bulk form with the flow of water directed through both stackable cartridges. As can be seen from FIG. 8 the use of the two interacting stackable cartridges 50 and 70 provides more precise control of the chlorine output rate since the chlorine output rate is delivered at a much lower rate as a function of the control valve setting. Thus, using the same bulk feeder 10 with stackable cartridges 70 and 50 and the same settings of the bulk feeder control valve 17 one can obtain a much lower chlorine level output rate and a finer control of the chlorine output from a chamber 87 of the bulk feeder 10 as evidenced by the more gradual slope of line 93 as opposed to the slope of line 92. Although, not fully understood the stackable cartridges 50 and 70, which both contain static inlet and outlet openings, are believed to provide an interaction and flow resistance that allows one to lower the delivery rate of chlorine as well as provide better control of the delivery rate and consequently, avoid conditions which may cause over chlorination even though the bulk feeder control valve 17 remains the same. In addition the stacked cartridge system allows one to maintain a lower level of halogen in the body of water which makes it suitable for a system that uses a second biocide.

Figure 9:
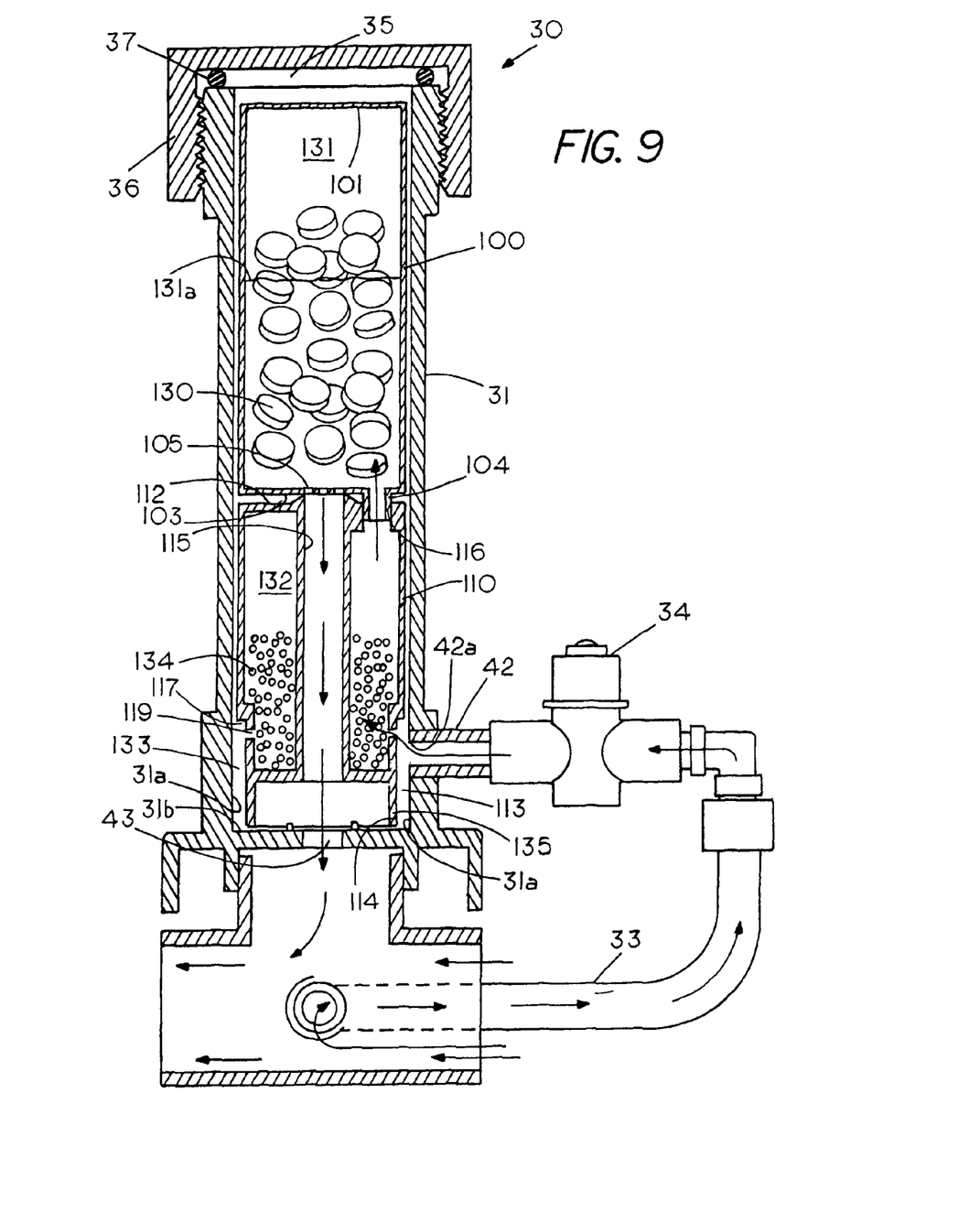
FIG. 9 is a cross section view of the bulk feeder of FIG. 2 with a set of stackable cartridges located therein.

FIG. 9 shows an example of prior art bulk feeder 30 with a slightly different set of stackable cartridges 100 and 110 located in a stacked condition therein. The bulk feeder 30 is characterized by lacking internal features for maintaining the stackable cartridges 100 and 110 in fluid alignment with each other and with an inlet from the control valve 34.

Figures 10, 13:
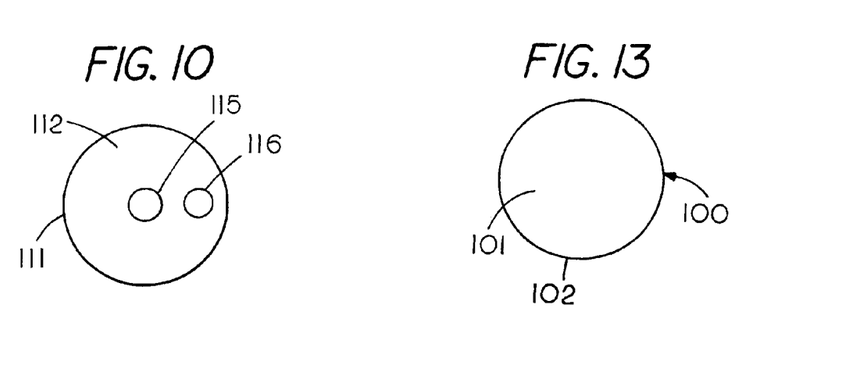
FIG. 10 is a top view of a stackable cartridge.
FIG. 13 is a top view of a second stackable cartridge.
Figure 11:
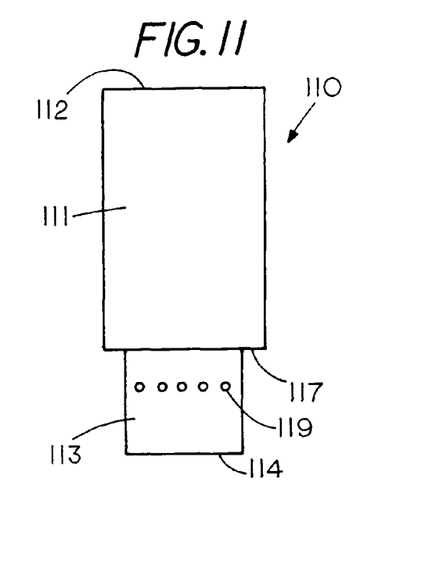
FIG. 11 is a front view of the stackable cartridge of FIG. 10
Figure 12:
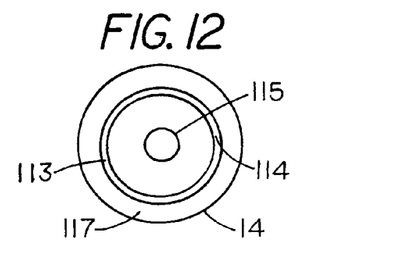
FIG. 12 is a bottom view of the stackable cartridge of FIG. 10
Figure 14:
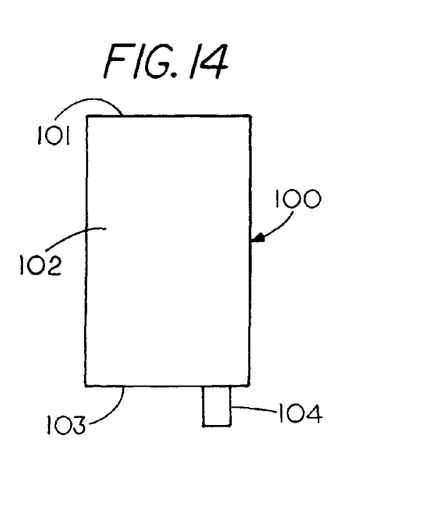
FIG. 14 is a front view of the stackable cartridge of FIG. 13.
Figure 15:
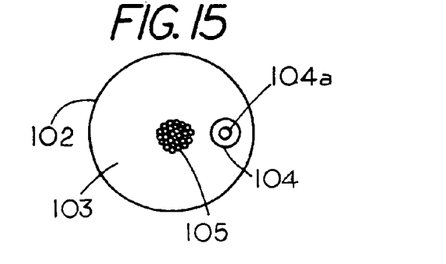
FIG. 15 is a bottom view of the stackable cartridge of FIG. 13.

FIGS. 10-12 show the bottom stackable cartridge 110 and FIGS. 13-15 shows the top stackable cartridge 100. Bottom stackable cartridge 110 comprises an annular housing 111 having a top member 112 with a central axial fluid passage 115 extending therethrough and a feature or locator comprising a top port 116 for engagement with a feature or locator of cartridge 100. In the example shown the spout 104 on stackable cartridge 100 provides a flow path between a chamber 132 (FIG. 9) in cartridge 110 and a chamber 131 (FIG. 9) in cartridge 100 as well as a feature or locator for maintaining the fixed rotational alignment of cartridge 100 with respect to cartridge 110 and correspondingly the fluid alignment of cartridge 100 to cartridge 110.

FIG. 9 shows the lower annular housing 113 of stackable cartridge 110 engages a bottom member 31a on feeder housing 31 to support the cartridge 110 in an upright or vertical position on the bottom of the bulk feeder 30, however, the lack of features which could lockingly engage the housing 30 precludes aligning an inlet of the cartridge 110 with the inlet 42a of the bulk feeder 30. Instead cartridge 110 includes a bottom inlet comprising a set of circumferential spaced ports 119 with an annular support 114 for engagement with the bottom surface 31b of bulk feeder 30. The set of ports 119 extend around a periphery of housing 113, which as shown in FIG. 9 are spaced from the interior wall 31a to form an annular chamber 133 so that the lower portion of housing 113 occupies less than an entire volume of the lower portion of the bulk feeder to enable water enter housing 31 to flow into annular chamber 133 before entering the peripheral bottom inlet port 119 in cartridge 110. The annular chamber 133 allows the cartridge 110 to be placed in the bottom of bulk feeder 30 without the need for a locator or feature to maintain a fixed rotational position of the cartridge 110 with respect to the bulk feeder 30 since fluid can flow into the cartridge 110 from all sides of the cartridge through the peripherally spaced ports 119. That is, the first stackable cartridge 110 includes a cylindrical surface setback 113 of a lower portion of the first cylindrical cartridge 110 from the top portion of the first stackable cartridge to create an annular fluid chamber 133 between a bulk feeder sidewall 31a and the cylindrical surface setback of the first stackable cartridge to permit flow in the chamber 133 around the lower portion of the first stackable feeder 110 before the water enters the bottom of stackable cartridge through the bottom peripheral ports 19, which are spaced around the exterior of the stackable cartridge 110. Correspondingly, the cylindrical spacing of the upper portion of first stackable cartridge 110 from the sidewall 31a of the bulk feeder 30 is dimensioned so as to be able to maintain the first stackable cartridge 110 in a stable upright position with clearance therebetween to allow the first stackable cartridge to be removed from the bulk feeder without the aid of tools when either or both of the stackable cartridges need to be replaced.

FIGS. 13-15 show an example of an upper stackable cartridge 100, which normally contains a halogen such as bulk chlorine or bulk bromine tablets therein, having a cylindrical side wall 102 with a closed top 101 and a bottom member 103 having a set of centrally located ports 105 and a locator 104 comprising a neck or spout having a fluid passage 104a therein. The purpose of locator 104 is to maintain the alignment of the outlet port 116 in stackable cartridge 110 with the inlet fluid passage 104a so that water that flows through minerals 134, which are located in stackable cartridge 110 (see FIG. 7) can be directed into the chamber 131 of stackable cartridge 100 to contact the halogen tablets 130 located therein. The set of openings or ports 105 in stackable cartridge 100 permit flow of water out of chamber 131 but are sufficiently small so as to prevent tablets or pucks of a halogen from falling therethrough.

FIG. 9 shows the interacting of stackable cartridge 100 and stackable cartridge 110 when the cartridges are located in chamber 35 of prior art bulk feeder 30. Both the stacked dispensing cartridges and the bulk feeder are shown in section to reveal the flow patterns through the stackable cartridges. The bulk halogen 130, which normally is located in chamber 35 of the bulk feeder (see FIG. 2), is now located in chamber 131 of stackable cartridge 100. The source of metal ions, which was not found in the bulk feeder 30 is now located in annular chamber 132 in stackable cartridge 110.

In operation of the stackable cartridge 100 and stackable cartridge 110 the existing unmodified control valve 34 of bulk feeder 30 directs water through pipe 42 and the inlet 42a and into an annular plenum chamber 133 in bulk feeder 30. The water enters the bottom of cartridge 110 by flowing radially inward through the peripheral inlet openings 119 and into the minerals 134 therein. Thus, in cartridge 110 the water flows upward through the minerals 131 and out of chamber 132 through the top port 116 of stackable cartridge 110. The water then enters cartridge 100 through inlet 104 and circulates upward through the bulk halogen tablets 130, which are located in chamber 131 of stackable cartridge 100. The water which then picks up the halogen from the halogen tablets therein flows out of chamber 131 though outlet ports 105, which are located in axial alignment with the axial passage 115 in stackable cartridge 110. The water, with the halogen therein, flows through the bulk feeder outlet 43 where it enters the main line.

Thus, in the example shown in FIG. 9 a stackable cartridge 110 containing a batch of minerals 134 includes a top member 112 and a bottom member 113 each having an opening (119, 116) for flow of a liquid therethrough while preventing passage of the minerals therethrough. The stackable cartridge container 100 containing a batch of halogen in solid form with a bottom member 103 having an inlet 104 for ingress of liquid therethrough while retaining the halogen in solid form therein and an outlet located below a top of the halogen cartridge 100 with the halogen cartridge 100 stackable on top of the mineral cartridge 110 to provide a flow path therebetween and an axial flow path from the halogen cartridge 100 through the mineral dispensing cartridge 110 whereby the liquid flows through the outlet 43. Thus the lower stackable cartridge 110 supports the upper stackable cartridge 100 in a stacked condition where fluid can be directed vertically upward through a first chamber 132 in stackable cartridge 110 and into the chamber 131 in stackable cartridge 100 where after picking up the biocides from each of the chambers it starts it return journey to the main line from whence it came.

In each of the above examples the flow of water through the stackable cartridges has been restricted by the materials in the stackable cartridges or by restricted features in the flow path between stackable cartridges.

Figure 16:
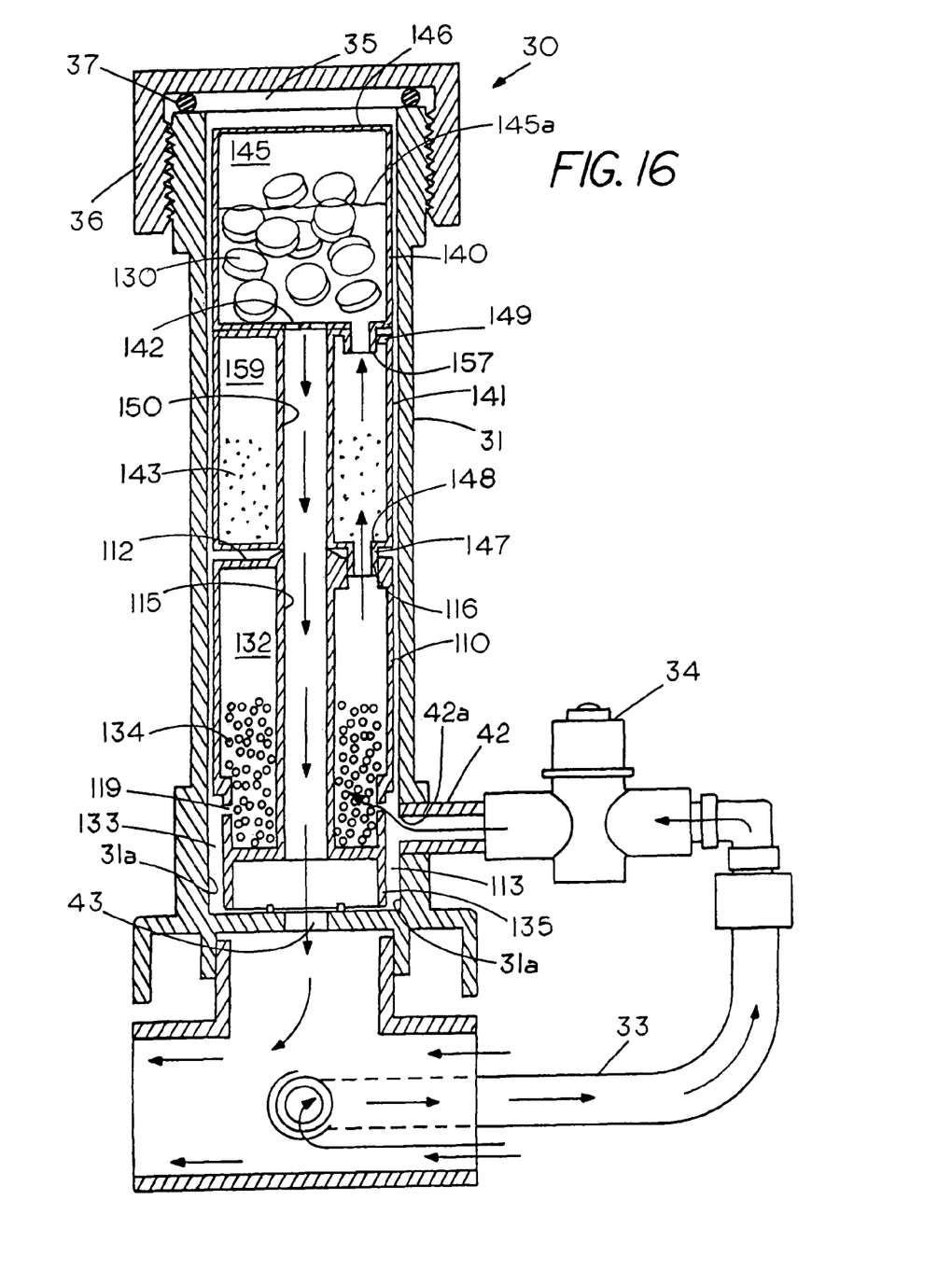
FIG. 16 shows is a cross section view of the bulk feeder of FIG. 2 with a set of three stackable cartridges located therein.

While the use of two stackable cartridges are shown and described in some cases there may be benefit and advantages to use of multiple stackable cartridges. FIG. 16 shows the feeder of FIG. 9 with three stackable cartridges located in the chamber of the feeder. In this example the top stackable cartridge 100 of FIG. 9 has been replaced with two stackable cartridges 141 and 140, although other configurations or sizes may be used which when stacked fit within the chamber of the feeder housing.

In this example the water enters the first stackable cartridge 110 through port 42a of cartridge 110 and flows through minerals 134 and out the top of cartridge 110 and into stackable cartridge 141 through an inlet spout 147 which forms a feature that fits into the opening 116 in cartridge 110 to maintain the cartridge 110 and 141 in fluid alignment with each other. The water then enters the chamber 159 in stackable cartridge 141 where it contacts a water treatment material 143. The water treatment material may be any of a number of different types of water treatment materials including an algaecide, a clarifier, a pH adjuster or other materials that are beneficial in maintaining the body of water in a safe condition for use by humans. One of the advantages of the use of a multiple stackable cartridge system is that different types of water treatment materials can be delivered continuously. This is particularly beneficial with a water treatment material such as a clarifier, which is consumed during the operation of the pool and must be periodically added to the pool. With the multiple stackable cartridges the clarifier can be added when the stackable cartridges are replaced to thereby provide release of a clarifier during an extended period of time.

After flowing through the water treatment material 141 the water flows into spout 157 of stackable cartridge 140 which forms a feature that fits into outlet 149 of stackable cartridge 141 to hold the stackable cartridge 140 in fluid alignment with stackable cartridge 141 which is in turn held in fluid alignment with stackable cartridge 110. Although spouts and mating openings are shown as features to maintain the stackable cartridges in fluid alignment other features and methods may be used.

The water enters chamber 145 through spout 157 with the water filling the lower portion of chamber 145 as indicated by water line 145a, i.e., the interface between the water and the air that is trapped in the top of stackable cartridge 140 by the closed top 146 and the cylindrical sides of stackable cartridge 140. The water flows through the chlorine tablets 130 and then out through a restrictive opening comprising a set of small openings 142 which prevent the tablets of pucks from falling through but allow the dissolved material to flow therethrough. The contact between the chlorine tablets and the water in chamber is limited since a portion of the chlorine tablets 130 are located above the water line 145a. This feature allows one to reduce the rate of dissolution of the chlorine tablets since a portion of the chlorine tablets are maintained in an out of the water and in an undissolved or uneroded condition during the initial phase of the chlorination. As the chlorine tablets 130 dissolve the tablets that are above the water line gradually fall below the water line and are dissolved or eroded and directed into the main line through outlet 142. Thus the water which now contains materials from stackable cartridges 110, 157 and 140 then flows down through passage 150, passage 115 and opening 43 where it is returned to the main line.

While the stackable cartridge containing the halogen has been shown as the top most stackable cartridge it may be located at a different vertical position.

If it is desired to extend the halogen delivery of the halogen cartridge the use of a closed chamber with an air pocket to trap air therein allows one to extend the time before the water comes into contact with the halogen. However, in some cases one may wish to dispense with the air pocket as a means for extending the delivery of the halogen.

In the event the halogen cartridge was not the last cartridge in a series of stacked cartridges the water would be directed in and out of the stackable cartridge with the halogen but instead of the water going directly to a return line the water would flow upward into another stackable cartridge or cartridges before returning to the main line.

FIG. 2A shows a swimming pool 38 using an existing bulk feeder 30, which contains two or more cartridges connected to a pool circulation system comprising pipe 46, pump 39 and pipe 42 with the output side of bulk feeder 30 connected to pool 38 through pipe 48. In this example no system changes are needed to deliver two or more materials.

We claim:

1. A cartridge system for reducing over chlorination in a bulk feeder having a single dispensing chamber comprising:
    a first vertically stackable cartridge 50 containing a batch of minerals therein, said first stackable cartridge having a top member and a bottom member each having an opening for flow of a liquid therethrough while preventing passage of the minerals therethrough, said stackable cartridge including a locator for engaging a feature of the bulk feeder to thereby maintain a fixed rotational position of the stackable cartridge with respect to the bulk feeder; and
    a second vertically stackable cartridge 70 containing a batch of halogen in solid form, said second stackable cartridge having a bottom member having a bottom inlet for ingress of liquid therethrough while retaining the batch of halogen in solid form therein, said second stackable cartridge vertically stacked on top of said first stackable cartridge to provide a diametrical flow path therebetween and an inline vertical flow path from said first stackable cartridge to said second stackable cartridge whereby a portion of the liquid flows through the batch of halogen and through a top outlet in the second stackable cartridge with said second stackable cartridge including a locator for maintaining a fixed rotational position of the second stackable cartridge with respect to the first stackable cartridge.

2. The cartridge system of claim 1 wherein the locator on the first stackable cartridge and the locator on the second stackable cartridge are in engagement with a common feature of the bulk feeder to maintain the first stackable cartridge and the second stackable cartridge in fluid alignment with each other.

3. The cartridge system of claim 1 wherein the locator in the first stackable cartridge includes a notch for a non rotational engagement with a vertical feature of the bulk feeder and the second stackable cartridge includes a notch for a non rotational engagement with the vertical feature of the bulk feeder.

4. The cartridge system of claim 1 including a support to maintain the second stackable cartridge in a stacked but bottom spaced condition from the first stackable cartridge and the batch of halogen therein comprises chlorine in solid form and batch of minerals includes a source of silver ions.

5. The cartridge system of claim 4 wherein the batch of minerals includes silver chloride.

6. A cartridge system for a feeder comprising:
    a first stackable cartridge containing a biocide therein, said first stackable cartridge having a locator and a bottom port for flow of a liquid therethrough while preventing passage of solids therethrough; and
    a second stackable cartridge containing a second biocide, said second stackable cartridge having a locator, said locator on the second stackable cartridge having a spout and the locator on first stackable cartridge having an outlet wherein the spout engages the outlet of the first stackable cartridge to maintain the first stackable cartridge and the second stackable cartridge in a fixed rotational condition with respect to each other, said second stackable cartridge having an inlet for ingress of liquid therein with the locator of the first stackable cartridge and the locator of the second stackable cartridge engageable with each other for maintaining the first stackable cartridge in vertical fluid alignment with the second stackable cartridge when the second stackable cartridge is stacked on top of the first stackable cartridge to thereby provide an inline vertical flow path from the bottom port of said first stackable cartridge to an inlet of said second stackable cartridge.

7. The cartridge system of claim 6 including a third stackable cartridge wherein each of the stackable cartridges contains a water treatment material different from each of the other stackable cartridges.

8. The cartridge system of claim 6 wherein a lower portion of the first stackable cartridge includes a cylindrical setback from an upper portion of the first stackable cartridge for forming an annular fluid inlet chamber between a bulk feeder sidewall and the lower portion of the first stackable cartridge.

9. A system for converting a bulk feeder system to a multiple cartridge system comprising:
    an inline bulk feeder having a chamber therein for normally holding a halogen in tablet or puck form;
    a bulk feeder valve for control of water flow through an inlet in the bulk feeder;
    a first stackable cartridge positionable in a lower portion of said chamber, said first stackable cartridge occupying less than an entire volume of a lower portion of the chamber to thereby provide a fluid chamber proximate said first stackable cartridge; and
    a second stackable cartridge positionable in an upper portion of said chamber with said second stackable cartridge having a locator to maintain the first stackable cartridge in a fluid alignment with the first stackable cartridge to enable a portion of the water directed into a chamber in the first stackable cartridge to flow in a continuous vertical direction from the first stackable cartridge and into a bottom inlet of the second stackable cartridge before being discharged through a top outlet of the inline bulk feeder.

10. The system of claim 9 including a third stackable cartridge containing a water treatment material wherein the first stackable cartridge contains a source of metal ions and the second stackable cartridge contains a batch of halogen.

11. The system of claim 10 wherein the first stackable cartridge contains silver chloride and the batch of halogen comprises a puck or tablet of chlorine.

12. A cartridge system for placement in fluid series in an inline bulk feeder comprising:
 a first vertically stackable cartridge having a chamber for holding and dispensing a first biocide therefrom, said first stackable cartridge having a bottom inlet for a vertical flow of fluid through the first stackable cartridge, said first stackable cartridge having a top fluid outlet for flow of fluid therethrough; and
 a second vertically stackable cartridge stackable in fluid series on top of said first stackable cartridge, said second stackable cartridge having a chamber therein for holding a second biocide in solid form therein, said second stackable cartridge including a fluid locator for maintaining the second stackable cartridge in fluid alignment with the first stackable cartridge and a fluid outlet for discharging the fluid from the first stackable cartridge after the fluid flows through the second stackable cartridge.

13. The cartridge system of claim 12 wherein a fluid inlet in the second stackable cartridge is in fluid communication with the top fluid outlet of the first stackable cartridge.

14. The cartridge system of claim 12 wherein said second cartridge is stacked on said first cartridge to form a diametrical fluid passage therebetween.

15. The cartridge system of claim 12 said first cartridge includes a locator for maintaining a fixed orientation of the first cartridge with respect to a feature of the bulk feeder.

16. The cartridge system of claim 12 wherein the first biocide comprises a mineral and the second biocide comprises a halogen.

17. The cartridge system of claim 12 including a third stackable cartridge wherein each of stackable cartridges are stacked in an end-to-end condition with each having an outlet passage for directing fluid to either an adjacent stackable cartridge or back into a main line.

18. A cartridge system for placement in an inline feeder comprising:
 a first vertically stackable cartridge having a chamber for holding and dispensing a first water treatment material therefrom;
 a second vertically stackable cartridge stackable on top of said first stackable cartridge, said second stackable cartridge having a chamber therein for holding a second water treatment material with each of said vertically stackable cartridges having a bottom inlet and a top outlet for flow of water through the water treatment material therein and a feature for maintaining the first stackable cartridge and the second stackable cartridge in fluid alignment with each other when both are present in an inline feeder.

19. The cartridge system of claim 18 including a third vertically stackable cartridge stackable on top of said second stackable cartridge, said third stackable cartridge having a chamber therein for holding a third water treatment material therein and a feature for maintaining the third vertically stackable cartridge in fluid alignment with at least one of the other stackable cartridges with each of the stackable cartridges providing a fluid resistance to flow therethrough to thereby use an existing control valve on an inline feeder to maintain a restricted flow through each or all of the vertically stackable cartridges.

20. The cartridge system of claim 18 wherein each of the stackable cartridges includes a feature for maintaining each of the stackable cartridges in fluid alignment.

21. The cartridge system of claim 18 wherein at least one of the stackable cartridges contains a halogen and the bottom inlet and the top outlet on each of the stackable cartridges comprises a fluid restriction to allow an existing control valve on a feeder containing the stackable cartridges to limit over halogenation therefrom.

\* \* \* \* \*